United States Patent [19]

Yamamoto

[11] Patent Number: 4,912,606
[45] Date of Patent: Mar. 27, 1990

[54] VEHICLE LAMP DEVICE

[75] Inventor: Hiroshi Yamamoto, Shizuoka, Japan

[73] Assignee: Koito Manufacturing Co., Ltd., Tokyo, Japan

[21] Appl. No.: 263,929

[22] Filed: Oct. 28, 1988

[30] Foreign Application Priority Data

Oct. 28, 1987 [JP] Japan .......................... 62-163579[U]
Feb. 12, 1988 [JP] Japan ................................ 63-28921

[51] Int. Cl.$^4$ ............................................. B60Q 1/38
[52] U.S. Cl. ..................................... 362/61; 362/80;
362/309; 362/328; 362/332
[58] Field of Search ................... 362/61, 80, 215, 290,
362/298, 299, 300, 308, 309, 83, 328, 333, 335,
336; 340/50, 84, 87, 98; 350/276 SL, 276 R,
162.19, 162.24, 103, 109

[56] References Cited

U.S. PATENT DOCUMENTS

| 3,603,928 | 9/1971 | Speedy et al. | 340/87 |
|---|---|---|---|
| 3,809,880 | 5/1974 | Daumueller | 240/8.2 |
| 4,115,844 | 9/1978 | Bull et al. | 362/382 |
| 4,198,674 | 4/1980 | Ilhage et al. | 362/80 |
| 4,475,148 | 10/1984 | Tomforde | 362/61 |
| 4,654,761 | 3/1987 | Walsh | 362/80 |
| 4,710,857 | 12/1987 | Haug et al. | 362/61 |
| 4,740,871 | 4/1988 | Dilouya | 362/309 |
| 4,766,524 | 8/1988 | Ogawa et al. | 362/260 |

FOREIGN PATENT DOCUMENTS

| 54-39980 | 3/1979 | Japan | 362/309 |
|---|---|---|---|
| 54-39981 | 3/1979 | Japan | 362/309 |
| 54-39982 | 3/1979 | Japan | 362/309 |
| 54-45986 | 4/1979 | Japan | 362/309 |

Primary Examiner—Ira S. Lazarus
Assistant Examiner—Richard R. Cole
Attorney, Agent, or Firm—Sughrue, Mion, Zinn, Macpeak & Seas

[57] ABSTRACT

A vehicle lamp device for use as a combination clearance and side-marker lamp in which coloration of a clear clearance lens by light reflected from the colored marker lens is inhibited. The lamp device includes a lamp body, a clearance lens covering the lamp body, a marker lens covering an outside opening portion of the lamp body with the marker lens being connected at one end to the clearance lens and colored in a predetermined color such as amber, a bulb disposed inside the lamp device body, and a reflection surface for reflecting light reflected from the marker lens again toward the marker lens formed on an inner surface of a side wall opposed to the outside opening portion of the lamp device body. Also, front and rear surfaces of a lens attaching portion formed on the side surface of the clearance lens may be made light diffusing.

13 Claims, 3 Drawing Sheets

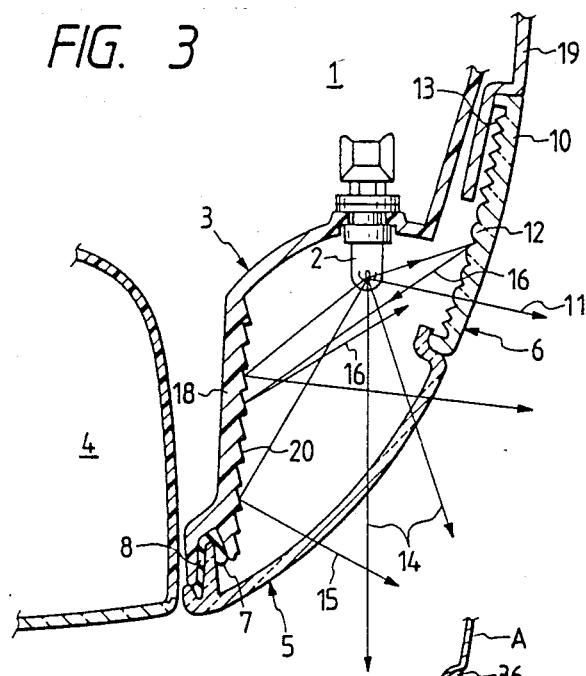
FIG. 3
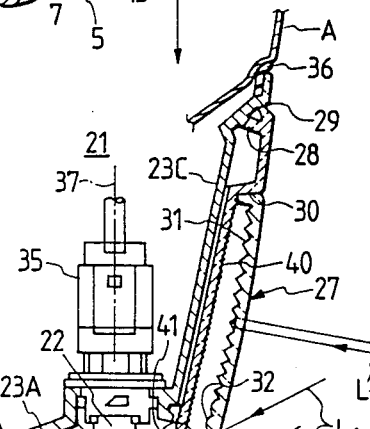
FIG. 4A
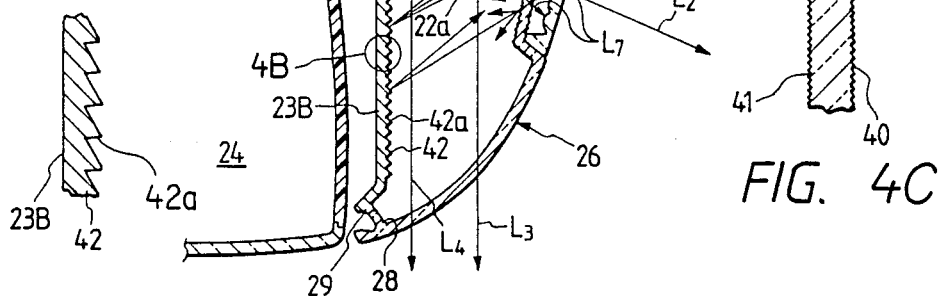
FIG. 4B
FIG. 4C

VEHICLE LAMP DEVICE

BACKGROUND OF THE INVENTION

The present invention relates to vehicle lamp device suitable for use, for example, as a clearance and side marker lamp, which simultaneously provides different lighting functions in the frontward (or rearward) direction as well as in the sideward directions of a vehicle.

Conventionally, there has been employed a clearance and marker lamp which is adapted to be attached to a corner portion of a vehicle body and is arranged as shown in FIG. 1. A lamp 1, using a single bulb, indicates the width of the vehicle and permits recognition of the vehicle from the side. The lamp device 1 is provided with a lamp device body 3 which is mounted adjacent a head lamp 4. The lamp device body 3 is open at the front side and at the outside of the vehicle body, and the front and outside open portions are covered with a clearance lens 5 and a marker lens 6, respectively. The clearance lens 5 is colorless. One end of the clearance lens 5 is inserted into a fitting groove 7 formed in the lamp device body 3 at its open end portion and is fixed thereto through an adhesive or the like. The marker lens 6 is colored amber (or orange). A recursive reflector 10 of well-known construction reflecting external light 9 incident from the side of the vehicle body back in the incident direction and a diffusion lens 12 for diffusing the outward bound light 11 from the bulb 2 are provided on the inner surface of the marker lens 6. The recursive reflector 10 is constituted by a number of recursive reflection elements 13 composed of cubic-cornered protrusions, each having three planes perpendicular to one another. (See Japanese Utility Model Unexamined Publication No. 51-42373.) The diffusion lens 12 is constituted by a number of small convex lenses.

In such a lens 1, light 14 emitted frontwards from the bulb 2 as well as reflected light 15, which is emitted from the bulb 2 toward the center of the vehicle body and which is incident and reflected on an inner surface of a side wall 18 opposed to the outward opening portion of the lamp device body 3, are transmitted outwards through the clearance lens 5. Light 11 directed to the outside is transmitted outwards through the diffusion lens 12 while being diffused by the diffusion lens 12. Light which impinges on the recursive reflection elements 13 as well as the light 11 which impinges on the diffusion lens 12 is partly reflected in such a manner that the reflected light 16 impinges on the inner surface of the side wall 18 so as to be reflected therefrom to pass through the clearance lens 5 towards the outside. Reference numeral 19 designates the vehicle body.

In such a conventional lamp 1, however, there has been a problem in that the reflected light 16, which is emitted from the bulb 2 and reflected n the diffusion lens 12 or the recursive reflection elements 13, is colored amber by the marker lens 6, and when the thus colored light is reflected again from the side wall 18 of the lamp device body 3 and the clearance lens 5 is irradiated with the colored light, the clearance lens 5 appears amber, thereby deteriorating the appearance of the lamp.

Another example of a conventional clearance and marker lamp is arranged as shown in FIG. 2. As in the previously described case, a lamp 21 has a function of indicating the width of the vehicle as well as permitting recognition of the vehicle from the side using a single bulb 22. In the case where the lamp 21 is attached at the front side of the vehicle, the lamp device 21 is provided with a lamp device body 23 provided adjacent to a head lamp 2 at the outside thereof.

The lamp device body has integrally formed therewith a rear wall portion 23A, an inner wall portion 23B and an outer wall portion 23C. The rear wall portion 23A has an inner surface which forms a parabolic reflection surface of revolution 25, the inner wall portion 23B extends frontwards from a vehicle center side edge of the rear wall portion 23A, and the outer wall portion 23C extends from the vehicle outer side edge of the rear wall portion 23A backwards, substantially parallel to the side surface of the vehicle body A. The lamp device body 23 is open at its front side and at its outer surface side, and the open portion is covered with a clearance lens 26, which is colorless. A fixing portion 28 of the clearance lens 26, integrally formed therewith and projecting along the entirety of the circumferential edge of the rear surface of the clearance lens 26, is heat-plate welded on the edge of the opening portion 29 of the lamp device body 23. A substantially rectangular recess portion, namely, a lens attaching portion 30 is formed at a side surface center portion of the clearance lens 26, and a marker lens 27 is fitted and ultrasonically welded to the lens attaching portion 30. The marker lens 27 is colored amber (or orange) and provided with a recursive reflection portion 31 and a marker portion 32. The recursive reflection portion 31 is constituted by a number of triangular-pyramid recursive reflection elements provided on a portion of the rear surface of the marker lens 27 projecting therefrom to recursively reflect external light $L_1$ incident on the marker lens 27 substantially perpendicularly thereto from the side of the vehicle body. Thus, the reflected light is returned in the same direction as the incident direction. The marker portion 32 is constituted by a plurality of rod-like diffusive convex lenses each of which has semicircular cross-section, which extend elongatedly vertically (in the direction perpendicular to the plane of the drawing), and which are arranged side by side in the longitudinal direction of the vehicle body. The marker portion 32 has an area smaller than that of the recursive reflector portion 31 and is surrounded by the reflector portion 31. The bulb 22 is inserted into the lamp device body 33 through a bulb-insertion hole 34 formed in the rear wall portion 23A of the lamp device body 23 with a filament 22a of the bulb 22 located at a focal point 0 of the reflective parabolic surface of revolution 25.

Reference numeral 35 designates a socket plug, and 36 designates an end rubber member for sealing between the vehicle body A and the outer wall portion 23C of the lamp device body 23.

In the thus-arranged lamp 21, of the light emitted by the bulb 22, direct rays of light $L_3$ directed toward the front of the vehicle body, reflection light $L_4$ directly incident on the reflective parabolic surface of revolution 25 an reflected frontwards therefrom parallel to an optical axis 37, and reflection light $L_5$ directly incident on the inner surface of the inner wall 23B and reflected therefrom slantingly frontwards pass through the clearance lens 26 at its front portion to thereby indicate the vehicle width. On the other hand, a part of the light $L_2$ directed to the outer side of the vehicle body exits to the outside after being diffused by the marker portion 32 to thereby make it possible to recognize the vehicle body from the side direction of the vehicle. The remaining part of the light $L_2$ is incident on the marker portion 32 or a rear surface 30a of the lens attaching portion 30 and reflected inward therefrom.

Light L₁, which is a part of the light externally incident from the side direction of the vehicle body, is recursively reflected by the recursive reflector portion 21 in the same direction as the incident direction, and light L₆, which forms the other part of the externally incident light, is incident into the lamp 21 through the marker portion 32 and the lens attaching portion 30, and then reflected again on the inner surface of the inner wall portion 23B so as to pass through the front portion of the clearance lens 26 while lighting that portion.

However, similar to the first-described case, such a conventional lamp 21 has a problem in that the light L₆ incident into the lamp 21 through the marker lens 27 and the lens attaching portion 30 from the side direction of the vehicle body as described above is colored in the color of the marker lens 27 (amber), so that when irradiated with the light L₆ reflected on the inner surface of the inner wall portion 23B, the clearance lens 26, which should appear white, looks amber when viewed from the front thereof, add thus the appearance of the clearance lens 26 is poor. This applies to a part o the light L₂ directed from the lamp to the outside of the vehicle body. This is because light L₇, which is emitted from the bulb 22 toward the outside of the vehicle body, transmitted through the lens attaching portion 30, and reflected by the recursive reflector portion 31 or the marker portion 32, is incident on the inner surface of the inner wall portion 23B and reflected again therefrom. The reflected light L₇ is transmitted through the front portion of the clearance lens 26 while illuminating that portion.

SUMMARY OF THE INVENTION

I is therefore an object of the present invention to provide a lamp device for a vehicle in which the problems described above are eliminated, which has a simple arrangement, and in which a clearance lens is not colored by light reflected from a marker lens.

In order to attain the above and other objects, according to the present invention, in a vehicle lamp device in which a front side opening portion of a lamp device body is covered with a clearance lens and a outside opening portion of the lamp body is covered with a marker lens connected at one end to the clearance lens and colored in a predetermined color, and a bulb is disposed inside the lamp device body, a reflection surface for reflecting the reflected light from the marker lens again toward the marker lens is formed on an inner surface of a side wall opposed to the opening portion of the lamp device body.

In this lamp device, light reflected onto the marker lens is reflected again by the reflection surface provided on the inner surface of the side wall of the lamp device body towards the marker lens.

It is a further object of the present invention to provide a lamp device for a vehicle in which the problems as described above are eliminated, which has an extremely simple arrangement, and in which coloring of the clearance lens by external light incident into the lamp through the marker lens from the side direction of the vehicle body and light emitted from the bulb through the lens attaching portion and reflected on the inner surface of the marker lens is reduced or prevented to thereby improve the appearance from the front of the lamp device.

In order to attain this and other objects, according to the present invention, a vehicle lamp device is arranged so that front and side opening portions of a lamp body disposed at a corner portion of a vehicle body are covered with a clearance lens, and a marker lens colored in a predetermined color is attached to a lens attaching portion provided on a side surface of the clearance lens, wherein both the front and rear surfaces of the lens attaching portion being are made light diffusing.

According to the present invention, the light diffusing surfaces formed on the lens attaching portion diffuse external light incident into the lamp device through the marker lens from the side direction of the vehicle body as well as reflected light and light emitted by the bulb, transmitted through the lens attaching portion, and reflected on the inner surface of the marker lens so that the color of the light colored by the marker lens is diluted.

BRIEF DESCRIPTION OF THE DRAWINGS

FIG. 3 is a cross-sectional view showing a clearance and side-marker lamp of a first embodiment of the invention;

FIG. 4A is a cross-sectional view taken on a line V—IV in FIG. 5 showing another embodiment of the present invention plied to a clearance and side-marker lamp;

FIG. 4B is an enlargement of the portion of FIG. 4A indicated by reference numeral 4B;

FIG. 4C is an enlargement of the portion of FIG. 4A indicated by reference numeral 4C;

DESCRIPTION OF THE PREFERRED EMBODIMENTS

Figure 1:
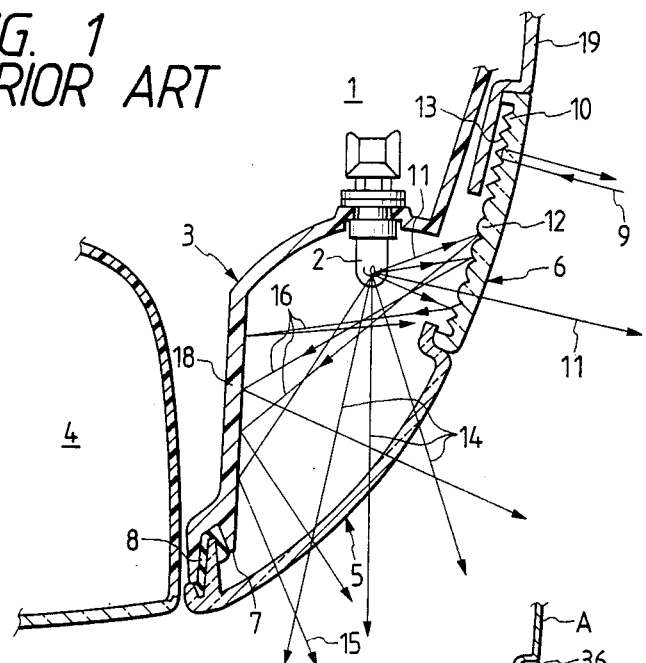
FIG. 1 is a cross-sectional view showing a conventional clearance and side-marker lamp.

The present invention will now be described in detail with reference o preferred embodiments illustrated in the drawings.

FIG. 3 is a cross-sectional view showing a first preferred embodiment of a vehicle lamp device according to the present invention in the form of a clearance and side-marker lamp. In this drawing, the same constituent members and portions as those in FIG. 1 are correspondingly referenced and hence a further description of those elements will be omitted.

An important feature of the embodiment of FIG. 3 is the provision of a reflection surface 20 for reflecting light 16 reflected from a marker lens 6 again toward the lens 6. This reflection surface 20 is formed on an inner surface of a side wall 18 opposed to an outside opening portion of a lamp device body 3. Other parts of the lamp device are similar to the conventional lamp device arrangement shown in FIG. 1.

The reflection surface 20 has a sawtooth-like form having a number of triangular-prism-like protrusions formed side by side in the direction of the optical axis. Also, the reflection surface 20 is made reflective by deposition of an aluminum film through evaporation, coating with white paint, or the like.

In the thus-arranged lamp 1, the light 16 reflected from the marker lens 6 is reflected again by the reflection surface 20 towards the marker lens 6 to thereby prevent the reflected light 16 from being reflected to the outside through the clearance lens 5. Thus, the clearance lens 5 is not colored amber by the reflected light 16, resulting in an improvement in the appearance of the lamp 1. Further, even if the inner surface of the side wall 18 is seen through the clearance lens 5 from the front side of the lamp 1, since the reflected light 16 is not transmitted frontwards, the inner surface of the side wall 18 never looks amber.

As described above, according to the present invention, n a vehicle lamp device arranged so that a clearance lens and a marker lens, which cover the opening portion o a lamp device body, are irradiated simultaneously by a single bulb to thereby obtain a clearance as well as a side-marker function, the reflected light from the marker lens is reflected again toward the marker lens by a reflection surface provided on an inner wall of the lamp device body. Thus, the clearance lens is not irradiated with the lens color or the marker lens and the appearance of the clearance lens is improved. Further, the lamp device is simple in arrangement.

The present invention will now be further described in detail with reference to a second preferred embodiment.

Figure 2:
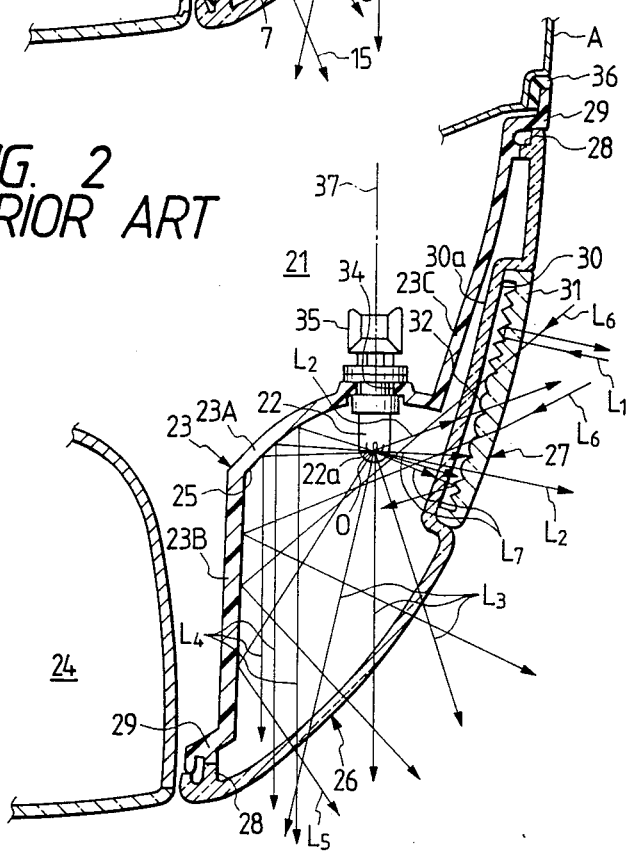
FIG. 2 is a cross-sectional view showing another conventional clearance and side-marker lamp.
Figure 5:
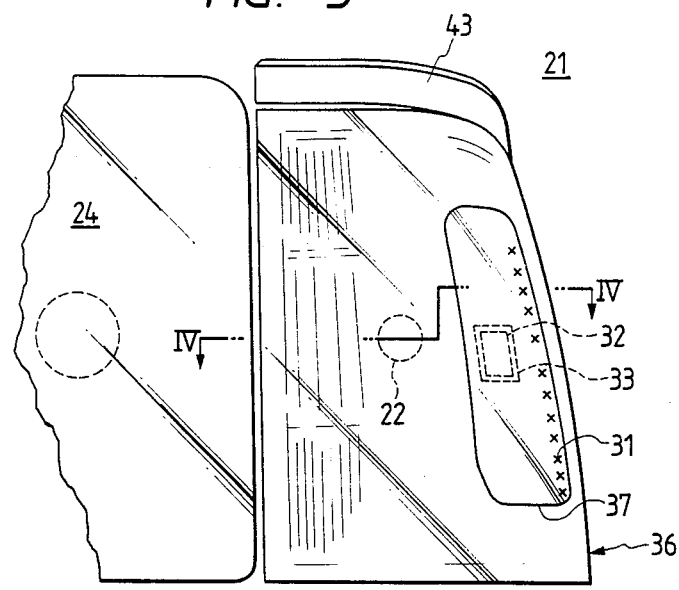
FIG. 5 is a front view of the embodiment of FIG. 4.
Figure 6:
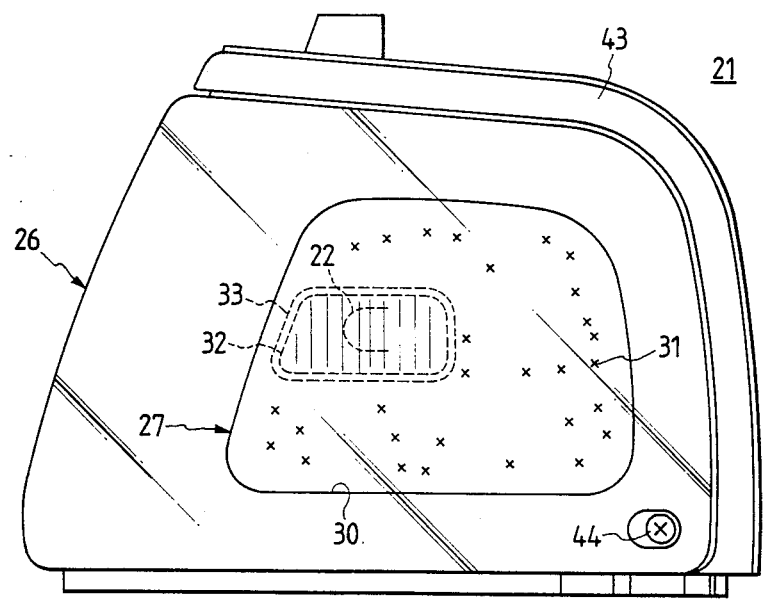
FIG. 6 is a side view of the same.

FIG. 4A is a cross-section taken on a line IV—IV in FIG. 5 showing a second embodiment of a clearance and side-marker lamp, and FIGS. 5 and 6 are, respectively, a front view and a side view of the same. FIG. 4B is an enlargement of the portion of FIG. 4A indicated by reference numeral 4B, while FIG. 4C is an enlargement of the portion of FIG. 4A indicated by reference numeral 4C. The same constituent members and portions as those in FIG. 2 are corresponding referenced, and a further description thereof will be omitted. In those drawings both the front and rear surfaces of a lens attaching portion 30 are formed with recesses or formed with small protrusions so that the front and rear surfaces are made to be light diffusing surfaces 40 and 41, respectively. This embodiment of the present invention is an example in which the light diffusing surfaces 40 and 41 are constituted by roughened surfaces formed through a crimping treatment.

A light-transmitting hole 33 is formed through a bottom surface of the lens attaching portion 30 at a position corresponding to a marker portion 32 of a marker lens 37. When light $L_2$ emitted sidewards from a bulb 22 so as to illuminate the marker portion 32 is transmitted through the lens attaching portion 30, the light transmitting hole 33 prevents the light $L_2$ from being absorbed inside the lens attaching portion 30 to thereby realize brighter lighting. Further, a reflection surface 42 is formed on an inner surface of an inner wall portion 23B of a lamp device body 23. The reflection surface 42 is constituted by a number of projecting stripes each having a substantially right-angled triangular cross-section and each having a sloping portion 42a directed to the front end portion of the lens attaching portion 30, that is, to a part of the lens attaching portion 30 projected towards the front of the vehicle beyond the outer wall portion 23C of the lamp device body 23. The reflection surface 42 is treated to be reflective by deposition of aluminum through evaporation, by coating with white paint, or the like.

Reference numeral 43 designates a rim, and 44 designates a fixing screw for fixing the clearance lens 26 to the lamp device body 23.

The remaining arrangement is similar to the conventional lamp device illustrated in FIG. 2.

In the thus-arranged lamp 21, when external light $L_6$ incident into the lamp 1 through the marker lens 27 from the side direction of the vehicle body is transmitted through the lens attaching portion 30, the light $L_6$ is diffused by both the front and rear surfaces, that is, the light diffusing surfaces 40 and 41, of the lens attaching portion 30, so that the light $L_6$ is made to be diffused light of a dim color. Similarly to the light $L_6$, when reflected light $L_7$, which is emitted from the bulb 22 toward the side direction of the vehicle body, incident on the inner surface of the marker lens 27, and then reflected on that inner surface, is transmitted through the lens attaching portion 30, the reflected light $L_7$ is also diffused by the light diffusing surfaces 40 and 41 so that the light $L_7$ is made to be diffused light of a dim color. Accordingly, the intensity of the diffused light $L_6$ and $L_7$ with which the front surface portion of the clearance lens 26 is irradiated from the inside is made extremely low, and even if irradiation with the light $L_6$ and $L_7$, the front surface portion of the clearance lens 26 is light in color and scarcely colored in the color of the marker lens 27 in comparison with the case of the conventional lamp device shown in FIG. 2. Thus, the appearance of the clearance lens 26 is quite good. In accordance with the present invention, since the reflection surface 42 having a substantially sawtooth cross-section is provided on the inner surface of the inner wall surface 23B of the lamp device body 23, the diffused light $L_6$ and $L_7$ is reflected toward the lens attaching portion 30. Accordingly, the quantity of light directed frontwards t illuminate the front surface portion of the clearance lens 26 is reduced, and hence the appearance of the clearance lens 26 is further improved.

Although the light transmitting hole 33 is provided in the lens attaching portion 30 in this embodiment, the hole 33 is not always required.

According to the present invention, as described above, in a vehicle lamp device having both a clearance and side-marker function and in which a clearance lens and a marker lens are irradiated by a single bulb, both the front and rear surfaces of a lens attaching portion provided on a surface of a side surface portion of the clearance lens are made to be light diffusing so that the external light incident into the lamp device from the side direction of the vehicle body through the marker lens provided on the lens attaching portion, as well as the reflected light emitted from the bulb and reflected on the inner surface of the marker lens, are diffused by the light diffusing surfaces. As a result, the diffused light is diluted in color corresponding to the degree of diffusion, whereby the clearance lens is prevented from being colored and the front appearance of the lamp device is improved.

What is claimed is:

1. A vehicle lamp device comprising: a lamp body, a transparent clearance lens covering a front opening portion of said lamp body; a marker lens covering a side opening portion of said lamp body, said marker lens being connected at one end to said clearance lens and colored in a predetermined color; a bulb disposed inside said lamp device body; and a reflection surface for reflecting light reflected from said marker lens back toward said marker lens formed on an inner surface of a side wall opposed to said side opening portion of said lamp device body, whereby light reflect from said marker lens is prevented from being reflected toward said clearance lens.

2. The vehicle lamp device of claim 1, wherein said reflection surface has a sawtooth-like form having a plurality of triangular-prism-like protrusions formed side by side in a direction of an optical axis thereof.

3. The vehicle lamp device of claim 2, wherein said reflection surface comprises a reflective coating.

4. The vehicle lamp device of claim 3, wherein said reflective coating comprises an aluminum coating.

5. The vehicle lamp device of claim 3, wherein said reflective coating comprises a coating of white paint.

6. A vehicle lamp device comprising: a lamp body having front and side opening portions opening frontwards and sidewards of a vehicle body on which said lamp body is installed at a corner portion, a transparent clearance lens covering said front and side opening portions; a marker lens colored in a predetermined color provided on a side surface of said clearance lens, front and rear surface of a lens attaching portion formed on said side surface of said clearance lens and to which said marker lens is attached being significantly light diffusing to dilute in color light passing through said marker lens; and a bulb provided inside said lamp body.

7. The vehicle lamp device of claim 6, wherein said front and rear surfaces of said lens attaching portion are made light diffusing by a crimping treatment.

8. The vehicle lamp device of claim 6, wherein said front and rear surfaces of said lens attaching portion are formed with a large number of small protrusions.

9. The vehicle lamp device of claim 6, further comprising a reflection surface for reflecting light reflected from said marker lens again toward sad marker lens formed on an inner surface of a side wall opposed to said marker lens.

10. The vehicle lamp device of claim 9, wherein said reflection surface has a sawtooth-like form having a plurality of triangular-prism-like protrusions formed side by side in a direction of an optical axis thereof.

11. The vehicle lamp device of claim 10, wherein said reflection surface comprises a reflective coating.

12. The vehicle lamp device of claim 11, wherein said reflective coating comprises an aluminum coating.

13. The vehicle lamp device of claim 11, wherein said reflective coating comprises a coating of white paint.

* * * * *